March 24, 1953
R. ABT
2,632,568
DISH DRAINING AND DRYING RACK
Filed April 24, 1948
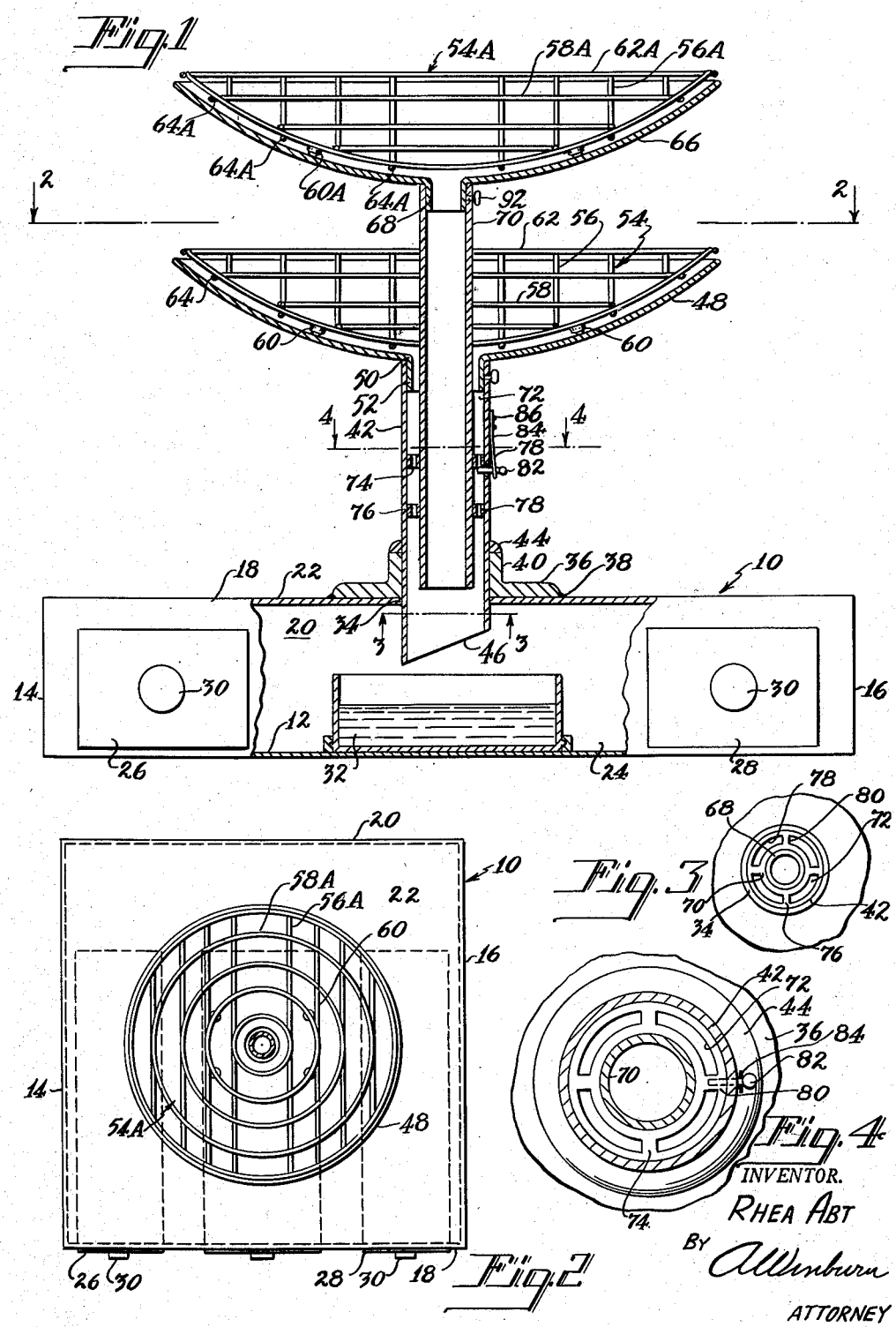
INVENTOR.
RHEA ABT
BY Allwinburn
ATTORNEY Patented Mar. 24, 1953

2,632,568

UNITED STATES PATENT OFFICE 2,632,568

DISH DRAINING AND DRYING RACK

Rhea Abt, New York, N. Y.

Application April 24, 1948, Serial No. 23,009

3 Claims. (Cl. 211—41)

This invention relates to draining and drying racks for dishes and the like.

An object of the invention is to provide an improved form of rack upon which dishes may be placed after washing them, so that the excess water thereon may drain off effectively.

Another object of the invention is to provide an improved form of portable dish draining and drying rack having means for gathering the excess water which drains off the dishes, and for conducting this water to a water receptacle forming part of the device, so that it is unnecessary to keep the rack full of dishes continuously over the kitchen drain board, but it may be lifted and moved to any convenient part of the kitchen and left there while the draining action takes place.

A further object of the invention is to provide an improved form of dish draining and drying device including a main base with water receptacle contained therein, an upstanding main support for a lower dish rack, an upper rack support for an upper dish rack, so that dishes may be disposed on both racks, and means for gathering the excess draining water from both racks and conducting it to said water receptacle.

Still another object of the invention is to provide a dish draining device of the type described, which is simple in construction, inexpensive to manufacture, and highly effective in use, and which may at the same time be adapted as a storage means for dishes when not in use.

Other objects and advantages of the invention will become apparent from the following description of a preferred embodiment thereof as illustrated in the accompanying drawings, and in which, Fig. 1 is a vertical sectional view of my improved dish drying rack, the base being partly in elevation;

Fig. 2 is a top plan view of the device shown in Fig. 1, but of reduced size;

Fig. 3 is a sectional view taken substantially on the line 3—3 of Fig. 1;

Fig. 4 is an enlarged sectional view taken substantially along the line 4—4 of Fig. 1.

In the use of dish draining and drying racks, it has heretofore been customary to dispose them permanently over kitchen sink drainboards, so that, when loaded with wet dishes, the water dripping therefrom will be conducted from the drainboard to the sink. This has certain disadvantages, particularly in that the normal area of a drainboard is usually limited, so that the number of dishes drying thereover is also limited. In addition, the need for keeping the dish drying rack always upon the drainboard prevents use of the drainboard for other important kitchen purposes. The present invention eliminates such difficulties.

In order to understand clearly the nature of the invention and the best means for carrying it out, reference may now be had to the drawings, in which like numerals denote similar parts throughout the several views.

As shown, my improved dish draining and drying device includes a main base generally indicated at 10 of any desired shape such as, for example, the rectangular shape shown, and having a bottom floor 12, upstanding side walls 14 and 16, and front and rear walls 18 and 20. The main base may be closed at the top by a roof or main platform member 22, so as to define an interior chamber 24.

The front wall 18 may be cut out to receive left and right sliding utility drawers 26 and 28 which are adapted for storage of any suitable articles such as cutlery and the like, the drawers being provided with suitable pull handles 30. Another opening may be cut into the front wall 18 between the two utility drawers 26 and 28, to receive the water receptacle drawer 32, which is made of suitable water-resistant or rust-resistant material, such as galvanized iron, stainless steel or plastic material.

An opening 34 is formed in the base platform 22, directly over the water receptacle drawer 32, and a circular flange member 36 is disposed concentrically over the opening 34, being secured to the plate 22 in any suitable manner, as by welding at 38. The base flange member 36 has an integral upstanding collar 40. A cylindrical main support tube 42 extends coaxially through the upstanding collar 40 of the base flange 36, and through the opening 34, and has an outer annular stop flange 44 which rests upon the upper surface of the collar 40, so as to limit downward movement of the main support tube 42. The lower end 46 of the tube 42 which extends into the base 10 may be beveled as shown, and is thus supported so as to discharge water directly into the water receptacle drawer 32.

A dished lower main bowl 48 of any suitable outside diameter is provided with a central opening 50 communicating directly with a coaxial integral discharge tube 52 seated inside the upper end of the main support tube 42 so as to support the lower main bowl above the platform 22. The main bowl 48 is of such size and contour as to accommodate a similarly curved lower dish rack 54 which may be made of a series of criss-crossed curved wires 46 and 58 which may be twisted together or welded together where they intersect with each other in the well known manner of such racks. Rubber feet 60 of any suitable design may be secured by twisting with wire or otherwise, to some of the criss-crossed wires in the lower dish rack, so as to support it slightly above and out of direct contact with the inner surface of the lower main bowl itself, thus avoiding obstruction of free flow of the water draining from the dishes in the rack 54.

The wire dish rack 54 will preferably have a circular wire rim 62 interconnecting all the ends of the criss-crossed rack wires 56 and 58. Similar circular intermediate wire rings 64, of decreasing diameters may be employed to interconnect intermediate portions of the wire rack, so as to make for greater inherent strength and to maintain the concave shape of the rack, under the weight of the dishes.

A second or upper dished bowl 66, similar in contour to that of lower bowl 48, is supported a predetermined distance above the lower bowl as shown best in Fig. 1, the upper bowl also having a central opening for conducting draining water into an integral discharge tube 68. The upper bowl 66 also has disposed therein an upper wire basket or rack 54A, similar in all respects to that for the lower wire basket 54 as already described, and being supported therein on rubber feet 60A.

The upper bowl 66 is seated upon the upper end of a hollow upper support tube 70, with its discharge tube 68 projecting inside the support tube 70 as shown, and retained therein by means of a set screw 92 threaded through the wall of the tube 70. The upper support tube 70 extends downwardly coaxially through the lower bowl discharge tube 52 and inside the lower main support tube 42, being of somewhat smaller outside diameter than tube 42 so as to be spaced internally therefrom and to thus form an annular channel or water passageway 72 therebetween. As shown, the outside diameter of the upper tube 70 is also less than that of the drip tube 52 so as to allow the water from the lower bowl to pass freely therebetween.

The said spacing of the upper tube 70 to form the water passageway is accomplished by means of two annular centering collars 74 and 76 which are spaced vertically one above the other on the inner tube 70, projecting radially therefrom, with their outside diameters being only slightly less than the inside diameter of the outer main tube 42, merely to avoid binding. Each centering collar 74 and 76 has cut therethrough a number of curved elongated slots 78 to allow the draining water to pass freely therethrough, the slots 78 being thus spaced by radial ribs 80.

A positioning pin 82 extends radially through an opening in the wall of the outer main tube 42, normally projecting inside the water passageway channel 72 under the influence of a leaf spring 84 secured to the outer surface of the tube by rivets 86. It is apparent that when the parts are in the position shown in Fig. 1, the upper annular centering collar 74 rests upon the positioning pin 82 so as to maintain the upper dish rack against moving to a lower position. If larger dishes are being placed to drain upon the lower rack 54, then it is only necessary to pull the positioning pin 82 partly out so as to clear the lower annular ring 76, allowing the upper rack to be raised to a higher vertical position relative to the lower rack. The pin 82 is then released, and returns to blocking position just below the now upraised lower annular ring 76, and thus locks the upper rack in its higher position. Several such annular rings 74 and 76 may be employed, if desired, to secure a variety of vertical adjustments of position.

By making all telescoping members relatively long along the telescoping portions thereof, as shown, any instability due to wobbling is eliminated. Each wire rack 54 and 56 may, if desired, have interior wire partitions to support the dishes in any desired positions.

The dishes which are drying on the drain device thus described, can be left right there after they are all dry, until needed, when they can easily be reached for use. This saves closet space. The upper and lower bowls are easily turnable about the vertical axis, so that they may be turned to reach the dishes instead of the user having to reach all around the rack. In addition, it is of importance that after the dish rack is loaded, the entire device can be manually lifted off the drainboard and placed elsewhere out of the way while drying, since any drain water flows inside the water drawer 32. The drainboard is thus free for other uses and the device of my invention may form an ornamental and useful storage member for dishes.

Although I have described a preferred embodiment of my invention in specific terms, it is to be understood that various changes may be made in size, shape, materials and arrangement without departing from the spirit and scope of the invention as claimed.

I claim:

1. A drying device comprising a base having a chamber formed therein, a water receptacle in said chamber, a main support tube carried by said base and communicating with said water receptacle, a first dished bowl adapted to support dishes and supported upon said main support tube and having a discharge opening communicating with said tube to conduct draining water thereto, a second dished bowl adapted to carry dishes to be dried, a second support tube adapted for carrying said second dished bowl and receiving draining water therefrom and extending inside said main support tube, and means for spacing said second support tube coaxially within said main support tube so as to form a water passageway therebetween for free passage of draining water into said water receptacle.

2. The construction according to claim 1, characterized further in that said spacing means comprises a plurality of annular collars carried by said second tube so as to space it from said main support tube, each of said collars having water passageway apertures formed therethrough.

3. The construction according to claim 2, characterized further in that means is provided for adjusting the vertical position of said upper dished bowl, comprising stop means carried by said main tube and normally projecting into the path of said annular collars on the second inner tube, so as to support the same, whereby, upon withdrawal of said stop means out of said path, the vertical position of the upper bowl may be adjusted so that any selected annular collar is supported by said stop means.

RHEA ABT.

REFERENCES CITED

The following references are of record in the file of this patent:

UNITED STATES PATENTS

| Number | Name | Date |
| --- | --- | --- |
| 213,523 | Murgatroyd | Mar. 25, 1879 |
| 290,528 | Burckett | Dec. 18, 1883 |
| 616,737 | Schuster | Dec. 27, 1898 |
| 738,301 | Dowd | Sept. 8, 1903 |
| 886,324 | Norris | Apr. 28, 1908 |
| 932,931 | Willmann | Aug. 31, 1909 |
| 1,472,804 | Mack | Nov. 6, 1923 |
| 1,476,599 | De Witt | Dec. 4, 1923 |
| 1,667,075 | Lippold | Apr. 24, 1928 |
| 1,804,099 | Hazy | May 5, 1931 |
| 2,378,628 | Gray | June 19, 1945 |